(12) United States Patent
Kempski et al.

(10) Patent No.: US 7,703,362 B2
(45) Date of Patent: Apr. 27, 2010

(54) FIBER CHOPPER AND METHOD OF CHOPPING

(75) Inventors: Douglas J. Kempski, Holland, OH (US); Michael David Folk, Oregon, OH (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 12/075,047

(22) Filed: Mar. 7, 2008

(65) Prior Publication Data

US 2008/0148911 A1  Jun. 26, 2008

Related U.S. Application Data

(62) Division of application No. 10/919,577, filed on Aug. 17, 2004, now Pat. No. 7,363,842.

(51) Int. Cl.
*B26D 1/00* (2006.01)
*B26D 7/06* (2006.01)

(52) U.S. Cl. ............... 83/13; 83/111; 83/347; 83/913; 83/950

(58) Field of Classification Search ............ 83/436.1, 83/950, 913, 111, 113, 436.6, 346–348
See application file for complete search history.

(56) References Cited

U.S. PATENT DOCUMENTS

| 4,411,180 | A | * | 10/1983 | Roncato | ............... | 83/37 |
| 4,528,050 | A | * | 7/1985 | Arther et al. | ............... | 156/62.4 |
| 4,551,160 | A | * | 11/1985 | Frailey et al. | ............... | 65/480 |
| 6,598,814 | B2 | * | 7/2003 | Bascom et al. | ............... | 440/88 F |
| 6,845,696 | B2 | * | 1/2005 | Font et al. | ............... | 83/36 |

\* cited by examiner

*Primary Examiner*—Boyer D Ashley
*Assistant Examiner*—Omar Flores-Sánchez
(74) *Attorney, Agent, or Firm*—Robert D. Touslee

(57) ABSTRACT

A method and system for separating long unwound items like fiber, fiber strands, yarn, etc. into short lengths. The system has a backup roll, a blade roll, an idler roll, a new-strand starting mechanism and a set of pull rolls. The improvements include a second starting roll spaced from a first starting roll as part of the new-strand starting mechanism and a guide aid for the pull rolls.

14 Claims, 3 Drawing Sheets

FIBER CHOPPER AND METHOD OF CHOPPING

This application is a division of application Ser. No. 10/919,577, filed Aug. 17, 2004. now U.S. Pat. No. 7,363, 842. The present invention involves an improved chopper for chopping continuous or very long loose items such as fiber, fiber strands, yarn, wire, string, ribbon, tape and the like by pulling the item(s) into the chopper while the loose items are held tightly against the surface of a rotating backup roll and carrying the item(s) on into a nip between a rotating blade roil and the rotating backup roll where they are separated into short pieces. More specifically the present invention involves a chopper having improved mechanisms and features.

BACKGROUND

It has long been known to chop continuous fibers or fiber strands into short lengths of about 3 inches or shorter. Billions of pounds of such product including chopped glass fibers and fiber strands are produced each year in process and chopping apparatus such as disclosed in U.S. Pat. Nos. 5,970,837, 4,551,160, 4,398,934, 3,508,461, and 3,869,268, the disclosures of which are incorporated herein by reference. The choppers disclosed in these patents comprise a blade roll containing a plurality of spaced apart blades for separating the fibers into short lengths, a backup roll, often or preferably driven, which the blades work against to effect the separation and which pulls the fibers or fiber strands and in some cases, an idler roll to hold the fibers or fiber strands down onto the surface of the backup roll. In the chopped fiber processes disclosed in these patents, the chopper is often the item most limiting the productivity of the processes. These processes typically operate continuously every day of the year, 24 hours each day, except for furnace rebuilds every 5-10 years.

The above choppers must be serviced every few hours, shifts or days, depending on the type of material being chopped, to replace a worn backup roll, a blade roll, or both and sometimes other components of the chopper. These service shutdowns of the chopper often mean that all of the bushings being served by the chopper are not only disrupted, but do not produce any salable product until the chopper is again running and the strands from each of the bushings have been restarted into the chopper. It usually takes 10-15 or more minutes to stop and service the chopper and to restart all of the 5-14 bushings that are normally served by the chopper. The fiberizing bushings usually do not run well for the first hour or two after a chopper service shutdown because the bushings loose their temperature equilibrium and uniformity during the disruption and it takes a period of time to regain the desired equilibrium. During this time the productivity is also reduced and the manual labor demand is increased.

Any improvement in the chopper that would allow the chopper to pull and chop faster and/or for longer times between service shutdowns, and/or to pull and chop more fibers or fiber strands at a time would have an extremely positive impact on productivity and production costs. The invention comprises improvements to the type of chopper shown in U.S. Pat. No. 4,551,160. Problems exist with this type of chopper that cause interruptions in production limiting productivity and causing higher than necessary manufacturing costs. Some of these problems are strand breakage in the chopper prior to chopping and resulting roll wraps. Each running strand, due to the high speed it is being pulled and the nature of the strand, is subject to being broken by interference from the loose end of a broken strand, fuzz clumps comprised of a web of chopped or broken fibers, and the worn, rough surface of the backup roll. When a strand breaks, the productivity of the fiberizing bushing is lost for a few minutes until the bushing beads down and the resulting new fiber strand is started back into the chopper. Also, too frequently, when a strand breaks at the chopper, an idler roll wrap or a strand guide roll wrap resulting in or requiring most or all of the strands to be broken out, the wrapped roll cleared of the wrapped strand or strands, and each of the fiber strands from each of the fiberizing bushings laced back into the chopper. Typical production time lost for the entire bushing leg from a roll wrap is about 10 minutes.

SUMMARY OF THE INVENTION

The present invention is an improved chopper for separating long lengths of one or more unwound items selected from a group consisting of fibers, fiber strands, wires, strings, tape (s), strip(s) and ribbon(s) into short lengths. One or more of, preferably a plurality of, the long lengths of material are pulled into the chopper in an unwound form at speeds exceeding 1,000 FPM, preferably at speeds exceeding 2000 FPM, first by the peripheral surfaces of a pair of pull rolls and subsequently by a moving elastomer working layer having a peripheral working surface on the peripheral surface of a rotating backup roll. The latter carries the item(s) on into a nip between the elastomer working layer and a rotating blade roll of the chopper. The improvement of the chopper comprises one or any combination of the following:

A) A second starter roll spaced from a first starter roll on a pivot arm for starting a new-item into said nip and for reducing roll wraps when starting a new-strand into the nip and B) a strand guide aid for a set of pull rolls for new strands, The invention also includes a method of chopping items as described above using the improved chopper described above having novel improvements as described above to separate the items into short lengths while optimizing backup roll working layer and blade lives and increasing chopping speed and productivity.

When the word "about" is used herein it is meant that the amount or condition it modifies can vary some beyond that so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without unexpected characteristics, those embodiments are within the meaning of the term about as used herein. It is not difficult for the skilled artisan or others to determine whether such an embodiment is either as might be expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
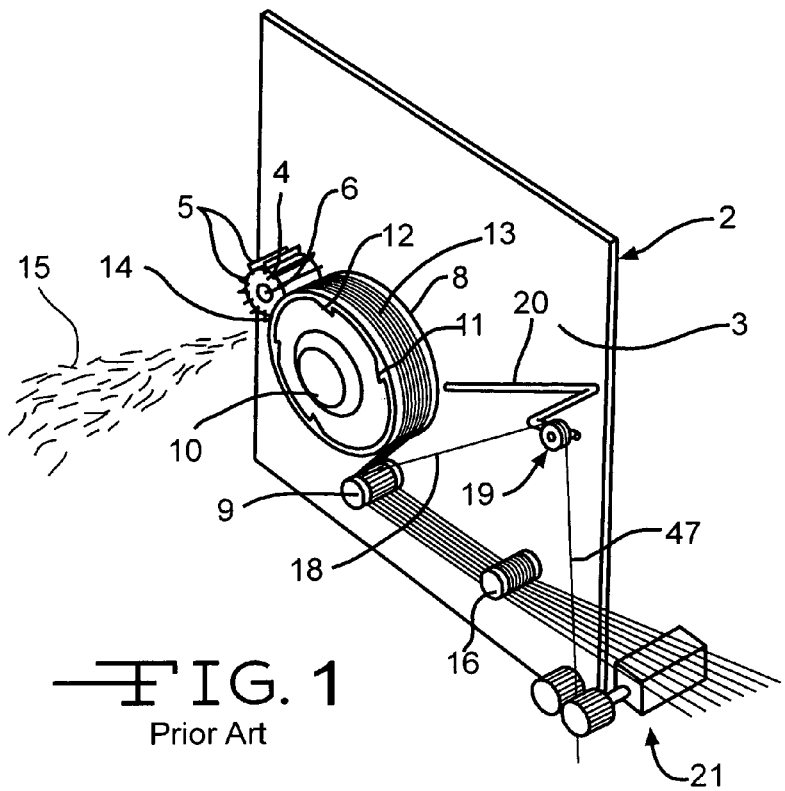
FIG. 1 is an elevational perspective view of a portion of a prior art chopper.

FIG. 1 shows a front elevation perspective view of a portion of a prior art chopper 2, of the type shown in U.S. Pat. No. 4,551,160, and that is used in making chopped strand glass fiber. It comprises a front plate 3, a blade roll 4 with spaced apart blades 5 contained in slots and projecting from the periphery of an integrated hub 6, a backup roll 8 and a free-wheeling idler roll 9. The blade roll 6 is usually made entirely of metal, but can be made using a thermoplastic material to hold spaced apart blades such as the blade rolls shown in U.S. Pat. Nos. 4,083,279, 4,249,441 and 4,287,799, the disclosures of which are herein incorporated by reference.

The backup roll 8 is held on a spindle (not shown) with a hub 9 and also has a metal rim 11 on which is a notch and projection 12 for starting a new strand 7 of fibers into the chopper. The backup roll 8 is biased against the blade roll 4 until the blades 5 press into the working layer of the backup roll 8 a proper amount forming a nip 14 to break or separate fiber strands 1 into an array of short length or chopped strands 15.

One or more, usually five or more and up to 14 or more strands 1, such as glass fiber strands, each strand containing 400-6000 or more fibers and usually having water and/or an aqueous chemical sizing on their surfaces, are pulled by the backup roll 8 into the chopper 2 and the nip 14. The strands 1 first run under a grooved guide roll 16, preferably with one or two strands 1 in each groove, and upward and over a working surface 13 of the backup roll 8, i.e. the exposed peripheral surface of the backup roll 8 on which the running strands 1 lay against and are supported while being severed by blades 5 on the blade roll 4. The working surface of the back up roll 8 is typically wider than the oscillating path of the glass fiber strands 1. The strands 1 then pass under the outer surface of the free-wheeling idler roll 9, which is located to provide sufficient contact of the strands 1 on the surface of the backup roll 8 to enable the latter to pull the glass fiber strands 1.

When a new strand 18 is ready to be started into the prior art chopper it is pulled to the front of the chopper 2 by the operator and pulled under the separator roll 16 and the idler roll 9 and up over a free-wheeling starter roll 19 attached to the end of a pivoting arm 20 and down between a nip of a pair of driven pull rolls, part of a conventional pull roll assembly 21, that pull the new strand 18 at a first low speed and deliver the new strand into a scrap bin or scrap basement. After the new strand 18 is being pulled by the pull roll assembly 21 at a low initial speed, the pull rolls 21, the pulling speed of the pull rolls 21 is ramped up to bring the new strand 18 to at least close to the speed of the strands 1 running into the chopper 2. When that speed is reached, the pivot arm 20 is pivoted counterclockwise to start the new strand 18 into the chopper 2 in the manner disclosed in U.S. Pat. No. 4,551,160.

Figure 2:
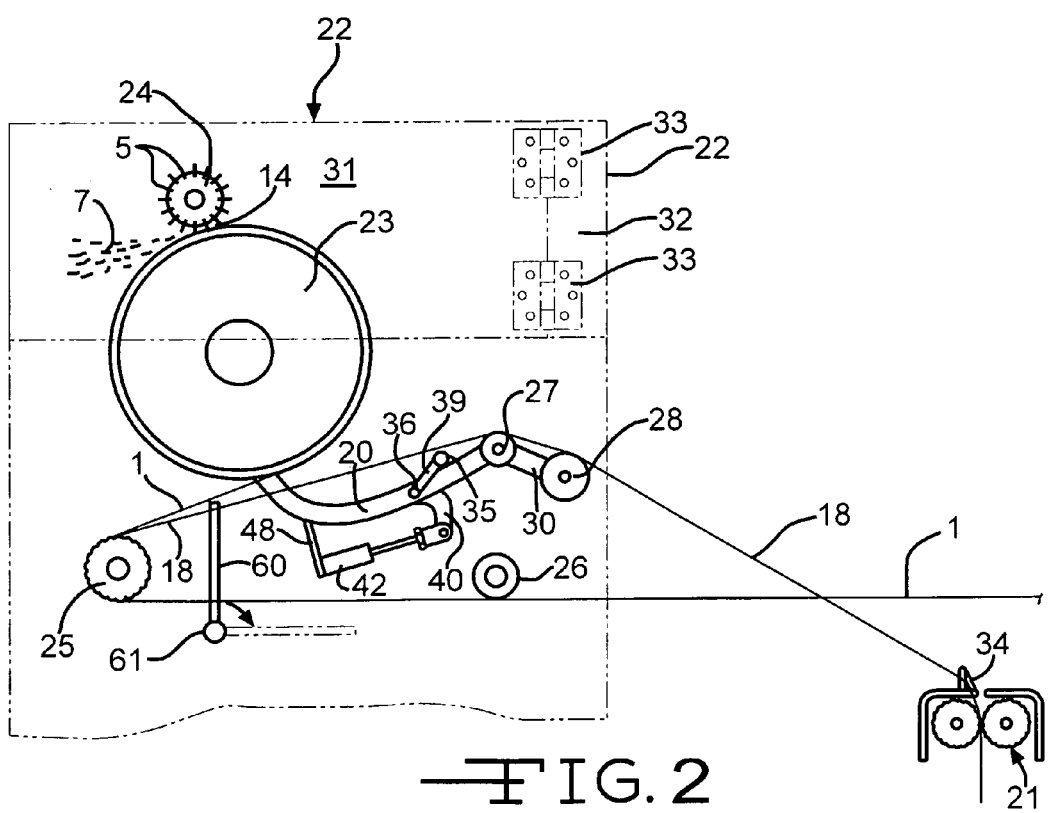
FIG. 2 is an elevation view of a portion of the chopper of the present invention showing the improvements described herein.

The improvements to the chopper, according to the present invention, are shown in FIG. 2 and in more detail in other figures described below. The chopper 22 comprises a frame 32, a cabinet front wall 39 and outboard of the cabinet front wall are a backup roll 23 having a working layer with a working surface 41, a blade roll 24 with a plurality of spaced apart blades 45, in a position to discharge the chopped strands 7 in a generally horizontal direction, a free-wheeling idler roll 25, a pivoting arm 20 and an optional first starter roll 27 and a second starter roll 28 located on a dog-leg arm 30 integral with or connected to the pivoting arm 29. A set of pull rolls 31 is located upstream of the chopper 22 having an item starter guide aid 34.

The second startup roll 28 for starting a new strand 18 positioned close to a first conventional, now optional, first startup roll 27 on a dogleg arm 30 attached to or integral with the first arm 29 reduces roll wraps caused in the prior art chopper by the waste portion of the new-strand 18 contacts the working surface of the backup roll 23. Instead of comprising a first startup roll 27 and a second startup roll 28, the chopper 22 can comprise a single startup roll 28 located on the end portion of a longer pivot arm 29. Both the first start up roll 27 and the second startup roll 28 can be free wheeling, but preferably are non rotating. In FIG. 2, the start up rolls 27,28, are shown in a home position, i.e. the position where each new strand 18 is first laced into a start up sub-system of the chopper 22.

Figure 3:
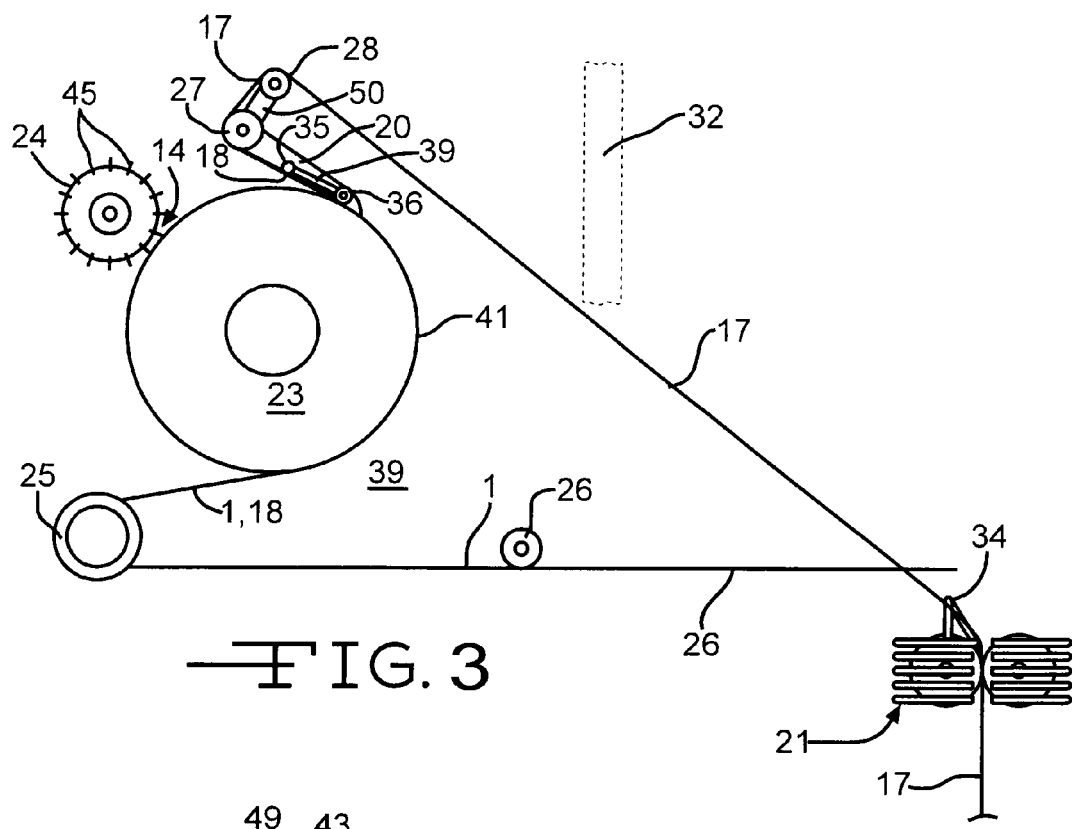
FIG. 3 is an elevation view of a portion of the chopper showing the function of one feature of the present invention.
Figure 4:
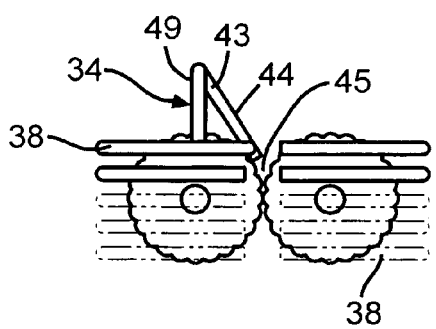
FIG. 4 is a front view of one feature of the present invention, a guide aid with a set of pull rolls.
Figure 5:
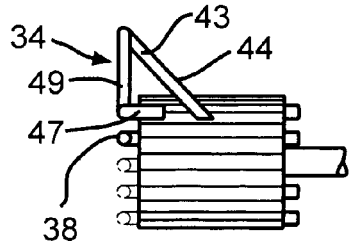
FIG. 5 is side view of the guide aid shown in FIGS. 2 and 4.
Figure 6:
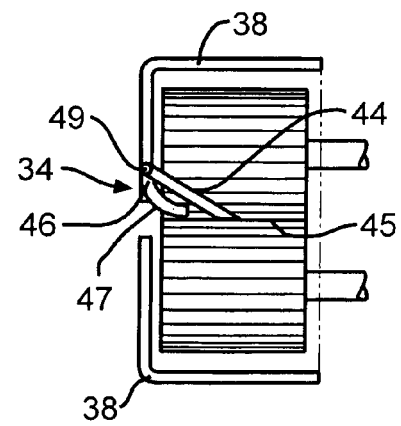
FIG. 6 is a plan view of the guide aid shown in FIGS. 2 and 4-5.

The invention will be described with the embodiment shown in FIG. 2. The start up sub-system of the chopper 22 is comprised the idler roll 25, the optional first start up roll 27, the second start up roll 28, the pivoting arm 20, the dogleg arm 30 and the conventional mechanism (not shown) that moves the arm 20 to move the start up rolls 27,28 in a counter-clockwise direction to generally a 12 o'clock position above the backup roll 23 to start the new strand 18 into the nip between the backup roll 23 and the blade roll 24, as seen in FIG. 3, and then returns the start up rolls 27,28 to the home position.

When an item running into the chopper breaks out between the nip of blade roll 24 and the backup roll 23 of the chopper and the source of the item, it is necessary to start that item back into the chopper. For purposes of describing the starting procedure, a strand of fibers, e.g. glass fibers, will be used. Only one new-strand 18 is started at any one time into the chopper 22 and each new-strand 18 runs in a plane that is in front of the running strands 1 and thus does not interfere with the running strands 1. A rod 60 in a vertical position holds the new-strand away from the running strands 1 and at the proper time is rotated out of the way by pivot shaft 60 in a known manner. This same procedure is used for starting each strand into the chopper when the chopper is first started up.

When the operator pulls each new-strand 18 over the first starter roll 27, or the second starter roll 28, and towards the set of pull rolls 21, the strand guide aid 34 makes it easy for the operator and saves him time, in getting the new-strand 18 into the nip 45 between the set of pull rolls 21. The strand guide aid 34 also keeps the new-strand 18 from catching or getting hung up on the guards 38, thus avoiding a break or aborted start. This strand guide aid 34 substantially improves the productivity of the chopped strand process by reducing item startup time and avoiding aborted item startups.

An optional third member of the strand guide aid 34 is a vertical member 49 attached at or near its base to a pull roll frame (not shown) or preferably to one of the guards 38. Any two of the members 43, 46 and 49, or all three members, can be integrated into one or two members, such as a continuous, bent, rod. Stainless steel is the preferred material of construction, but various plastics, brass or other materials used in the chopping environment are suitable.

When the operator pulls each new-strand 18 over the first starter roll 27, or the second starter roll 28, and towards the set of pull rolls 21, the strand guide aid 34 makes it easy for the operator and saves him time, in getting the new-strand 18 into the nip 45 between the set of pull rolls 21. The strand guide aid 34 also keeps the new-strand 18 from catching or getting hung up on the guards 18, thus avoiding a break or aborted start. This strand guide aid 34 substantially improves the productivity of the chopped strand process by reducing item startup time and avoiding aborted item startups.

FIGS. 2-6 show how a new strand 18 is transferred from the arrangement shown in FIG. 2 to become a running strand 1 being pulled by the rotating backup roll 23 and chopped at the nip 14 with a blade on the blade roll 24. After a new backup roll 23 has been in chopping mode for a few hours, the working surface 41 becomes rough. With the prior art arrangement for starting a new strand using only one start-up roll 27, a waste portion 47 of the new strand 18, that portion between the start-up roll 27 and the pull rolls 21, comes into contact with the working surface 41 and the rough surface frequently catches the waste portion 47 and breaks out the new strand 18 before it is completely transferred, thus frustrating the start-up of the new strand 18 and requiring the start-up procedure to be repeated. Also, occasionally the loose strand would wrap on the idler roll 25 causing a costly shut down of the chopper to clear the roll wrap. When this breaking out of the new strand 18 became too frequent, often after only about 10 hours of service on a backup roll 23, it was necessary to shut down the chopper 2 and replace the backup roll 23 even though it was still chopping running strands satisfactorily.

Figure 3A:
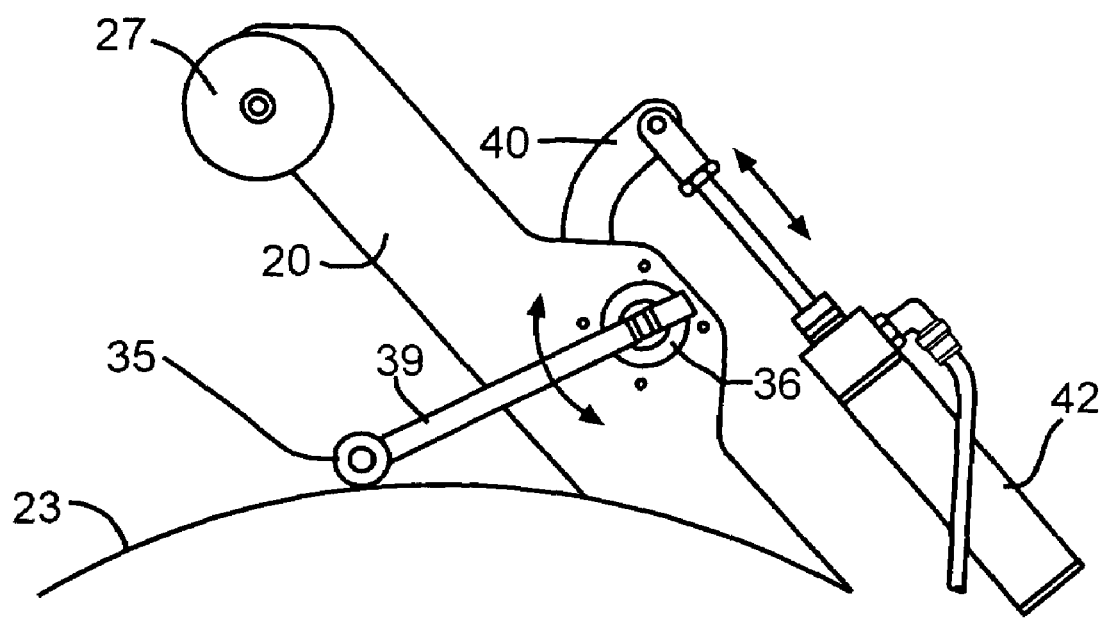
FIG. 3A is a partial elevation view of an arm 29 shown in FIG. 3 and showing more detail of one feature on the arm 29.

This problem is solved by one feature of the present invention because the second or repositioned start-up roll 28 keeps the waste portion 47 of the new strand 18 off of the working surface 41 of the backup roll 23, as shown in FIG. 3, until the new strand 18 has been successfully transferred to the working surface 41 of the backup roll 23 by moving a contact rod 35 by pivoting a first member 39 around a pivot point 36 to press the new-strand 18 against the working surface 41 of the backup roll 23. FIG. 3A shows more detail of how the contact rod 35, supported by a first member 39 that pivots at 36, is moved by a second member 40 connected to a rod end of a fluid cylinder 42 that can be activated at the appropriate time in a conventional manner to press the new-strand 18 against the working surface 41. The cylinder 42 is attached to the arm 20.

Once the new-strand 18 contacts the working surface 41, it is pulled by the working surface 41 to the nip 14 where it is severed by a blade 45 and becomes a running strand 1. The waste portion 17 of the new-strand 18 is pulled away from the chopper 22 by the pull rolls 21 and delivered to a conventional scrap collection means as soon as the new-strand 18 is severed by a blade 45 of the blade roll 24. Once the new-strand 18 has become a running strand 1, it is then manually, or mechanically, placed into the appropriate groove in the strand guide 26 in a known manner, and the arm 29 is returned to the home position shown in FIG. 2 to be ready for another new-strand 18 to be laced into the chopper 22. The addition of the feature comprising the second roll 28 mounted on the dogleg arm 30 attached to or integral with the arm 29 has greatly reduced aborted starts of new strands and roll wraps, substantially increasing productivity of the chopper.

Given the above disclosure many equivalents will be obvious to those of ordinary skill in the art and also many modifications that can be made from the preferred embodiments disclosed without changing the function or results except for possibly one of degree. Those equivalents and obvious modifications are included within the scope of the following claims.

What is claimed is:

1. A method of separating long lengths of unwound item(s) selected from the group consisting of fibers, fiber strands, string, yarn, wire, tape and ribbon into short pieces comprising feeding one or more items in an unwound form into a chopper comprising a frame, a rotatable backup roll outboard of one side of the frame, the backup roll having a peripheral working layer with a peripheral working surface, a rotatable blade roll outboard of the side of the frame, the blade roll having a plurality of blades or sharp edges spaced apart around its periphery for contact with and penetration of said items and into the peripheral working surface of the working layer of the backup roll, a pivot arm having a starter roll mounted near an outer end and an idler roll, comprising starting new-strands into the chopper by placing each new-strand partially around the idler roll and over the first starter roll on the pivot arm; the improvement comprising holding a waste portion of each new-strand away from the working surface of the working layer during the new-strand starting operation by locating a second starter roll on a dogleg arm attached to or integral with the pivoting arm to keep a waste portion of each new strand off of said working surface by placing each new-strand on the second starter roll after placing each new strand on the first starter roll.

2. The system of claim 1 wherein the dogleg arm is integral with the pivoting arm.

3. The system of claim 1 wherein the dogleg arm is attached to the pivoting arm.

4. The method of claim 1 wherein the system also comprises a set of pull rolls and an item guide aid mounted above and close to one of the rolls of the set of pull rolls, the item guide aid comprising an angled member having a strand contacting surface extending downward at an angle towards the nip for guiding a new item coming from the second starter roll into the nip and placing the new strand onto said item guide when placing the new strand into the set of pull rolls.

5. The system of claim 4 wherein the length of the dogleg arm and the location of the second starter roll is such that when the pivoting arm is in a position to place a new-item onto the working surface of the working layer, a waste portion of the new-item is not in contact with any part of the working surface.

6. The system of claim 4 wherein the guide aid also comprises a second member having a curved surface starting in the front of a pull roll closest to the chopper and curving towards the nip of the pull rolls.

7. The system of claim 6 wherein the first and second member are attached to a third member, the third member being generally vertical with a lower end attached directly or indirectly to a frame of the pull rolls.

8. A method of separating long lengths of unwound item(s) selected from the group consisting of fibers, fiber strands, string, yarn, wire, tape and ribbon into short pieces comprising feeding one or more hems in an unwound form into a chopper comprising a frame, a rotatable backup roll outboard of one side of the frame, the backup roll having a peripheral working layer with a peripheral working surface, a rotatable blade roll outboard of the side of the frame, the blade roll having a plurality of blades or sharp edges spaced apart around its periphery for contact with and penetration of said items and into the peripheral working surface of the working layer of the backup roll, a pivot arm having a starter roll mounted near an outer end and an idler roll and a set of pull rolls comprised of two rolls that form a nip where an outer peripheral surface of one of the two rolls makes contact with an outer peripheral surface of the other roll, the system capable of starting a new unwound item into the system with the pivoting arm and starter roll without interfering with other lengths of unwound item(s) running into the system, comprising starting new-strands into the chopper by placing each new-strand partially around the idler roll, over the first starter roll on the pivot arm and into a nip of the pull rolls; the improvement comprising a) holding a waste portion of each new-strand away from the working surface of the working layer during the new-strand starting operation by locating a second starter roll on a dogleg arm attached to or integral with the pivoting arm to keep a waste portion of the new-strand off of said working surface and when starting each new-strand, placing each new-strand on the second starter roll before putting the new-strand into the nip of the pull rolls and b) mounting and using an item guide aid mounted above and close to one of the rolls of the set of pull rolls, the item guide aid comprising an angled member having a strand contacting surface extending downward at an angle towards the nip of the set of pull rolls for guiding the new-strand coming from the second starter roll into the nip of the set of pull rolls.

9. The method of claim 8 wherein the second starter roll is spaced from the first starter roll and is further away from an axis of the backup roll during each new-strand starting process at a point where the new-strand contacts the working surface of the working layer of the backup roll, and when starting each new-strand, placing each new-strand on the second starter roll before putting the new-strand into the nip of the pull rolls.

10. The system of claim 9 wherein the length of the dogleg arm and the location of the second starter roll is such that when the pivoting arm is in a position to place a new-item onto the working surface of the working layer, a waste portion of the new-item is not in contact with any part of the working surface.

11. The system of claim 8 wherein the guide aid also comprises a second member having a curved surface starting in the front of a pull roll closest to the chopper and curving towards the nip of the pull rolls.

12. The system of claim 11 wherein the first member and the second member are integral.

13. The system of claim 11 wherein the first and second member are attached to a third member, the third member being generally vertical with a lower end attached directly or indirectly to a frame of the pull rolls.

14. The system of claim 13 wherein at least two of the first member, second member and third member are integral.

\* \* \* \* \*